(12) United States Patent
Boisture et al.

(10) Patent No.: US 8,177,243 B2
(45) Date of Patent: May 15, 2012

(54) LOAD-TRANSFERRING TRAILER ASSEMBLY ATTACHABLE TO A LOAD-BEARING VEHICLE

(75) Inventors: Thomas B. Boisture, Baytown, TX (US); Howard Lefler, Enid, OK (US)

(73) Assignee: Starcon International, Inc., La Porte, TX (US)

( * ) Notice: Subject to any disclaimer, the term of this patent is extended or adjusted under 35 U.S.C. 154(b) by 2345 days.

(21) Appl. No.: 10/194,812

(22) Filed: Jul. 12, 2002

(65) Prior Publication Data

US 2004/0007840 A1    Jan. 15, 2004

(51) Int. Cl.
*B62D 61/12*    (2006.01)
*B62D 13/02*    (2006.01)

(52) U.S. Cl. ..................................... 280/86.5; 280/81.6
(58) Field of Classification Search .................. 280/86.5, 280/81.6
See application file for complete search history.

(56) References Cited

U.S. PATENT DOCUMENTS

| | | |
|---|---|---|
| 3,298,706 A | 1/1967 | Lyall |
| 3,885,808 A | 5/1975 | Derrwaldt |
| 4,119,156 A | 10/1978 | Wheeler et al. |
| 4,165,792 A | 8/1979 | Hohl et al. |
| 4,335,898 A | 6/1982 | Orosz et al. |
| 4,449,726 A | 5/1984 | Strifler et al. |
| 4,783,096 A * | 11/1988 | Ramsey et al. ............... 280/86.5 |
| 5,090,495 A * | 2/1992 | Christenson ............... 180/24.02 |
| 5,163,698 A | 11/1992 | Evens |
| 5,320,376 A | 6/1994 | Bojarski et al. |
| 5,458,355 A | 10/1995 | Young |
| 5,474,320 A | 12/1995 | Bojarski et al. |
| 5,498,021 A * | 3/1996 | Christenson ................. 280/86.5 |
| 5,516,135 A * | 5/1996 | Christenson ............... 280/405.1 |
| 5,526,890 A | 6/1996 | Kadowaki |
| 5,540,454 A | 7/1996 | VanDenberg et al. |
| 5,549,322 A | 8/1996 | Hauri |
| 5,626,356 A | 5/1997 | Harwood |
| 5,816,605 A | 10/1998 | Raidel, Sr. |
| 5,823,629 A * | 10/1998 | Smith et al. ................. 298/23 R |
| 5,897,123 A | 4/1999 | Cherney et al. |
| 6,050,578 A * | 4/2000 | Beck ........................... 280/86.5 |
| 6,109,379 A | 8/2000 | Madwed |
| 6,116,698 A | 9/2000 | Smith et al. |
| 6,123,347 A | 9/2000 | Christenson |
| 6,135,469 A | 10/2000 | Hulstein et al. |
| 6,158,750 A | 12/2000 | Gideon et al. |
| 6,186,266 B1 | 2/2001 | Marchant et al. |
| 6,189,901 B1 | 2/2001 | Smith et al. |
| 6,247,713 B1 | 6/2001 | Konop |

(Continued)

*Primary Examiner* — Darren W Ark
(74) *Attorney, Agent, or Firm* — Fulbright & Jaworski L.L.P.

(57) ABSTRACT

A trailerable load-transferring assembly is removably attachable to the rear portion of a load-bearing vehicle. The load-transferring assembly includes a pivot connection, an auxiliary axle, an elongate abutment member that extends between a free end and an abutment end, and an actuator assembly disposed between the free end of the abutment member and the auxiliary axle. When the load-transferring assembly is connected to the vehicle by the pivot connection, the actuator assembly is actuated such that it applies a lifting force on the free end relative to the auxiliary axle. The lifting force causes the abutment member to pivot about the pivot connection, bringing the abutment end of the abutment member into an abutting engagement with an abutment surface attached to the frame of the load-bearing vehicle. The lifting force and abutting engagement prevents transverse movement of the load-transferring assembly relative to the vehicle and transfers a portion of the load from the vehicle's rear axles to the auxiliary axle.

25 Claims, 7 Drawing Sheets

U.S. PATENT DOCUMENTS

| | | |
|---|---|---|
| 6,273,447 B1 | 8/2001 | Vande Berg |
| 6,308,793 B1 | 10/2001 | Eberling |
| 6,311,795 B1 | 11/2001 | Skotnikov et al. |
| 6,311,993 B1 | 11/2001 | Hulstein et al. |
| 6,315,311 B1 | 11/2001 | Mathiowetz |
| 6,340,165 B1 | 1/2002 | Kelderman |
| 6,371,227 B2 | 4/2002 | Bartlett |
| 6,371,499 B1 | 4/2002 | Konop |

\* cited by examiner

LOAD-TRANSFERRING TRAILER ASSEMBLY ATTACHABLE TO A LOAD-BEARING VEHICLE

FIELD OF THE INVENTION

The present invention relates generally to trailer assemblies, and, more particularly, to a trailer assembly which, when attached to the rear of a load-bearing vehicle, transfers a portion of the load from the rear wheel axle of the load-bearing vehicle to the wheel axle of the trailer assembly.

BACKGROUND OF THE INVENTION

Roadway surfaces and bridges experience stresses due to the weight of load-bearing vehicles which travel the roadway systems. To lessen the detrimental effect of such traffic on the roadway systems, federal and state laws regulate load-bearing vehicles which travel federal and state roadways. These regulations dictate maximum loading per vehicle axle, which is based on the load-bearing capacity of roadway surfaces in the system, and minimum distance between load-bearing axles, which ensures that the vehicle's load is properly distributed over individual structural members of a bridge in the roadway system. Thus, vehicle weight restrictions generally are specified as a combination of load per axle and distance between axles.

To comply with such regulations, work vehicles that are designed to carry a substantial load often include some type of auxiliary axle that increases the vehicle's legal load-carrying capacity. Auxiliary axles generally include pusher axles, which typically are mounted forward of the vehicle's rear drive axle, and trailer or tag axles, which are mounted aft of the rear axle. Such auxiliary axles increase load-bearing capacity by redistributing the load on the vehicle's axles and/or extending the wheel base between load-bearing axles.

Pusher axles and many tag axles typically are deployable between a lifted or stowed position and a lowered or load-bearing position. Stowable configurations for tag axles generally employ hydraulically actuated piston assemblies that vertically pivot the axle relative to the vehicle to raise and lower the device. In the stowed position, the tag axle typically is positioned in a raised position at the rear of the vehicle. For some vehicles, tag axles in the stowed position can hinder loading and unloading tasks, thus rendering such arrangements impractical or unusable, particularly for vehicles have a flat loading bed.

Other trailer or tag axles may be configured as a detachable assembly. Typically, such assemblies include a pivotable connection that allows the assembly to pivot transversely relative to the vehicle such that the trailer axle can track behind the vehicle when turning. For some vehicles, however, transverse movement of the trailer relative to the vehicle can have detrimental effects on the stability of the vehicle during a turn as a result of the forces exerted by the trailer axle assembly on the vehicle frame which are necessary to redistribute the load on the axles. Further, transverse movement hinders maneuvers in a reverse direction. Thus, although a detachable trailer axle assembly does not present an obstacle to loading/unloading operations, other issues with respect to vehicle stability and maneuverability may arise.

Accordingly, it would be desirable to provide an auxiliary axle assembly that overcomes the aforementioned disadvantages of known auxiliary axle assemblies.

BRIEF SUMMARY OF THE INVENTION

The present invention is directed toward a trailer assembly that, when attached to the rear portion of a load-bearing vehicle, transfers a portion of the load from the vehicle's rear wheel axle to the wheel axle of the trailer assembly.

In accordance with one aspect of the invention, a load-transferring assembly comprises a frame assembly having an auxiliary wheel axle, an abutment member connected to the frame assembly that has an abutment end and a free end, and an actuator assembly disposed between the free end of the abutment member and the frame assembly. When the frame assembly is connected to the rear portion of the vehicle and the abutment member abuts a vehicle abutment member that is disposed proximate the rear of the vehicle, transverse movement of the frame assembly relative to the vehicle is substantially restricted. Further, when the actuator assembly is actuated such that a lifting force is applied to the free end of the abutment member, a portion of the load on a rear axle of the vehicle is transferred to the auxiliary wheel axle of the frame assembly.

In accordance with another aspect of the invention, a load-transferring trailer assembly comprises a frame assembly that includes a wheel axle assembly and a pivotal assembly configured to detachably engage a rear portion of a load-bearing vehicle. The trailer assembly further comprises an elongate member connected to the frame assembly and extending between a static connection end and a free end. The static connection end is configured to form a static connection with the rear portion of the vehicle such that transverse movement of the frame assembly relative to the vehicle is substantially inhibited. A lifting member is arranged between the static connection end of the elongate member and the wheel axle assembly and is configured to apply a lifting force to the free end such that a portion of the load on the rear vehicle axle is transferred to the wheel axle assembly.

In accordance with yet another aspect of the invention, a combination is provided that comprises a load-bearing vehicle and a load-transferring trailer assembly connected to the vehicle. The trailer assembly comprises a frame assembly having an auxiliary wheel axle, a elongate member connected to the frame assembly, and an actuator assembly. The elongate member has a static connection end and a free end. The actuator assembly is disposed between the free end and the frame assembly and is configured to apply a lifting force to the free end such that a portion of the load on the rear axle of the load-bearing vehicle is transferred to the auxiliary wheel axle.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
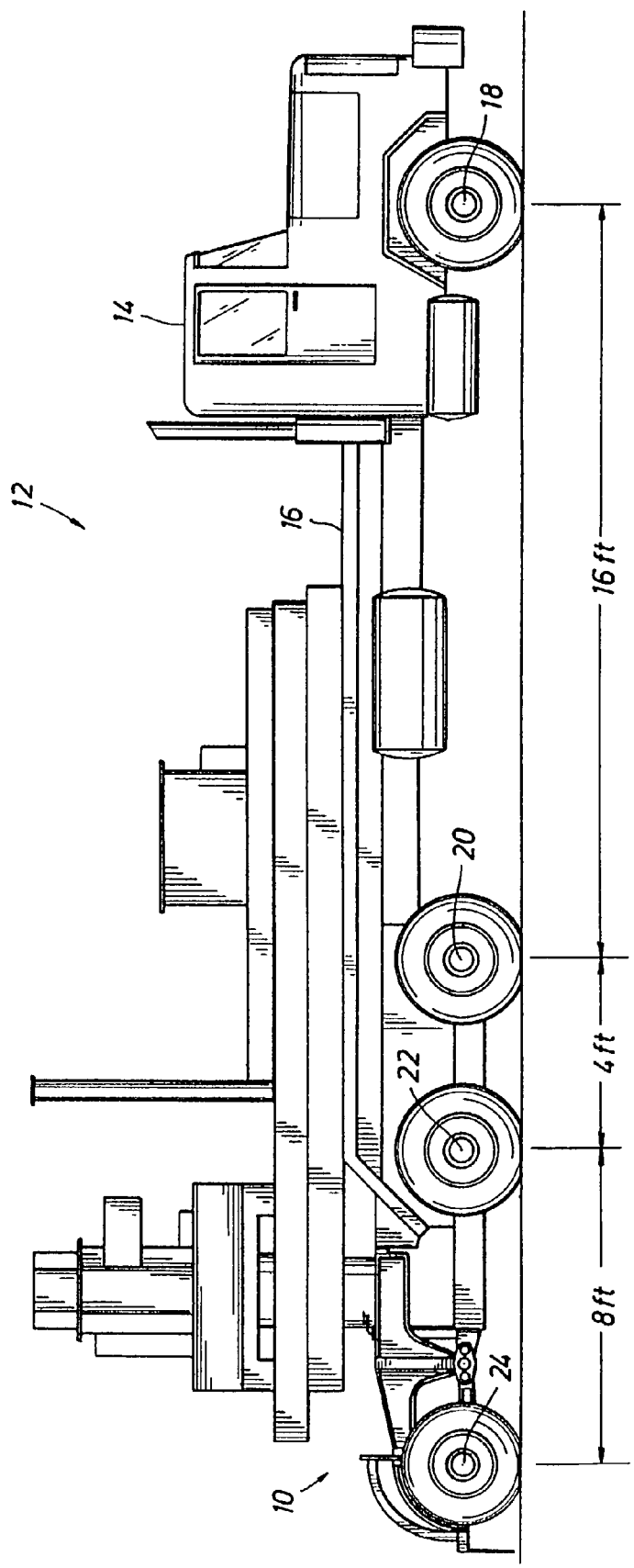
FIG. 1 is a side view of a load-transferring assembly attached to a load-bearing vehicle.

Referring first to FIG. 1, a trailerable load-transferring assembly 10 is shown attached to a load-bearing vehicle 12. The load-bearing vehicle 12 includes a front cab 14 and a flat load-bearing bed 16. The vehicle 12 has a front axle 18 and a rear tandem axle arrangement 20 and 22. The trailerable load-transferring assembly 10, which includes an auxiliary axle 24, is detachably coupled to the rear portion of the bed 16 in a manner that will be described in detail below.

In accordance with federal laws, the gross vehicle weight (i.e., the combined weight of the vehicle and its load) of a vehicle traveling on the interstate roadway system cannot exceed 80,000 lbs., the weight on any one axle cannot exceed 20,000 lbs., and the weight on any tandem axle cannot exceed 34,000 lbs. The maximum axle loads are further restricted by the federal bridge formula which dictates the maximum weight that may be borne by any two or more consecutive axles based on the inter-axle spacing. The bridge formula is as follows:

$$W=500[(L(N)/(N-1))+12(N)+36]$$

where W is the gross vehicle weight; L is the distance in rounded whole feet between the extreme of any group of two or more consecutive axles; and N is the number of axles in the group under consideration.

Thus, if the load-transferring assembly 10 is not attached to the vehicle 12 in FIG. 1, then the load on the single front axle 18 may not exceed 20,000 lbs., and the load on the tandem axles 20 and 22 may not exceed 34,000 lbs., or 17,000 lbs. per axle. These weight limitations are further restricted by the inter-axle spacing. In one exemplary embodiment, the distance between axles 18 and 20 is 16 feet, and the distance between axles 20 and 22 is 4 feet, for an overall length of 20 feet. For a vehicle with three axles, the federal bridge formula limits the gross vehicle weight to 51,000 lbs. If the distance between axle 22 and the auxiliary axle 24 is 8 feet, then the gross vehicle weight can be increased to 60,500 lbs. (i.e., 28 feet and 4 axles).

Figure 2:
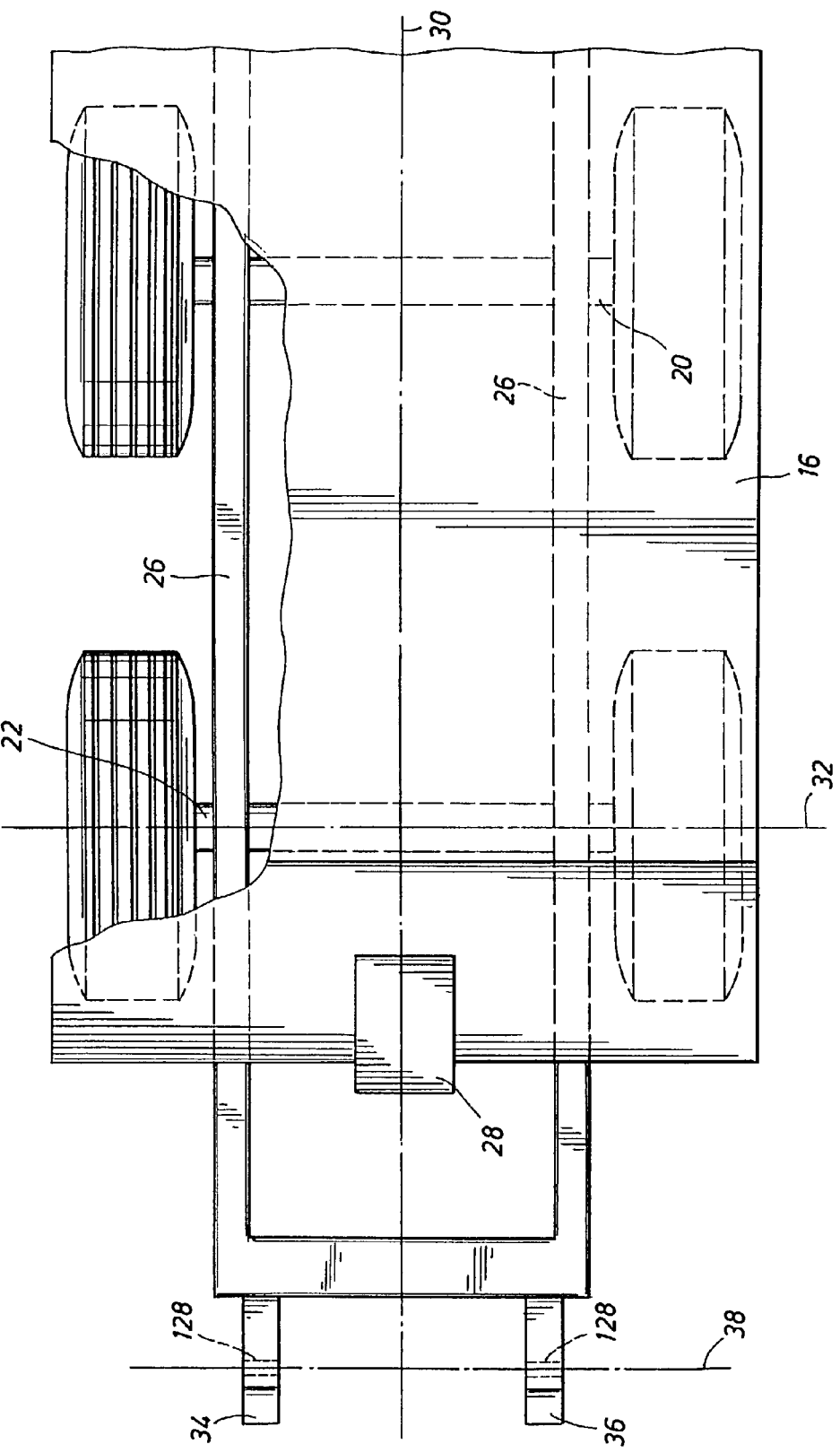
FIG. 2 is a plan view of a portion of the load-bearing vehicle of FIG. 1.

Referring now to FIG. 2, the bed 16 is supported by a chassis frame 26 coupled to the axles 20 and 22. In the embodiment illustrated in the Figures, the chassis frame 26 includes a vehicle abutment member 28 that extends from the rear portion of the vehicle 12 and is configured to engage with the load-transferring assembly 10. The vehicle abutment member 28 is generally disposed along a longitudinal axis 30 of the bed 16 that is generally centered transversely relative to a transverse axis 32 extending through the axle 22. The chassis frame 26 further includes engagement members 34 and 36 which are configured to engage with and retain the load-transferring assembly 10 in such a manner that the assembly 10 may pivot vertically about a transverse axis 38 that is generally parallel to the transverse axis 32. The engagement members 34 and 36 may be configured as any of a variety of structures suitable to retain the load-transferring assembly 10 attached to the vehicle 12 in a manner that allows vertical pivotal movement about the transverse axis 38.

Figure 3:
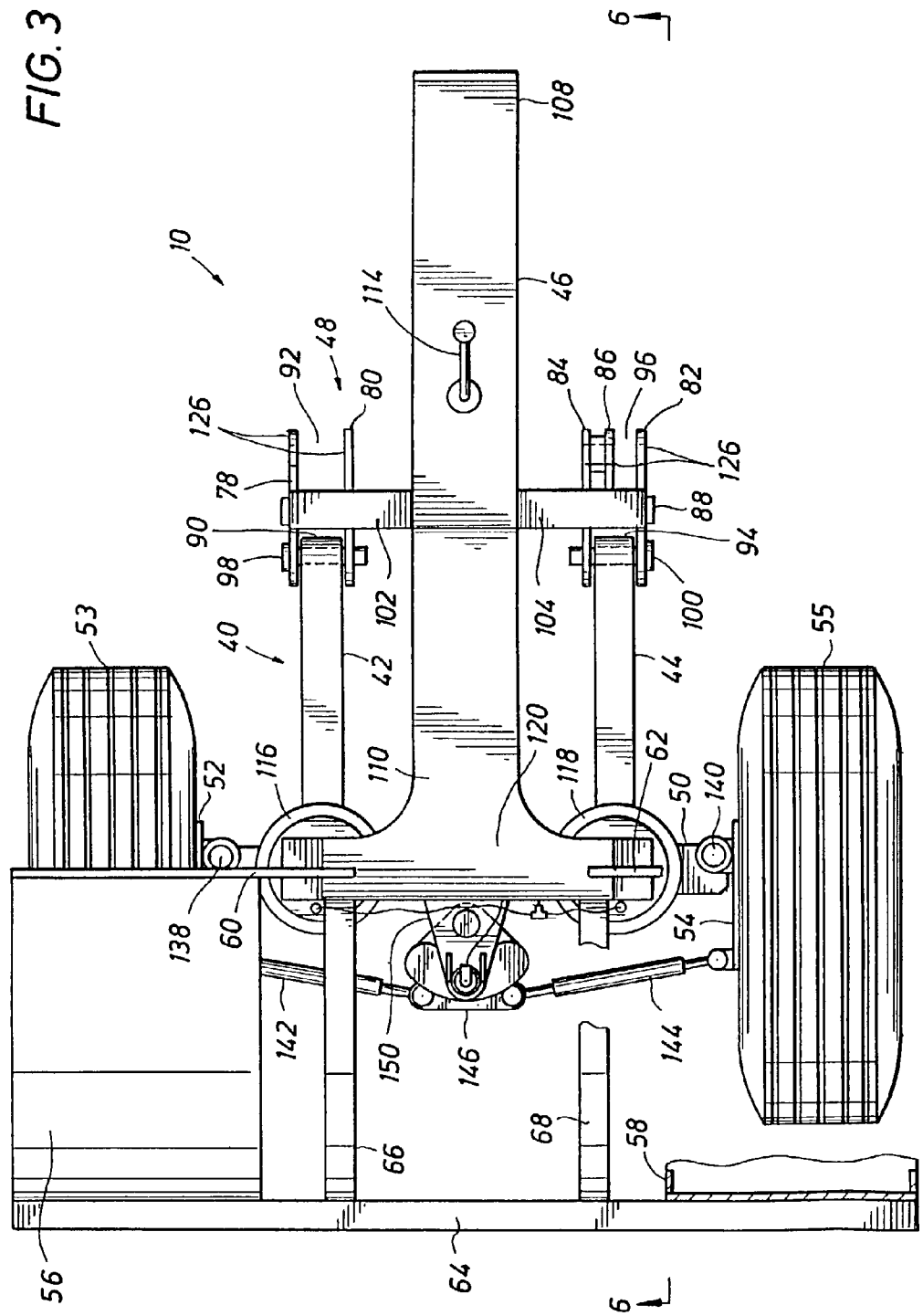
FIG. 3 is a plan view of the load-transferring assembly of FIG. 1.
Figure 4:
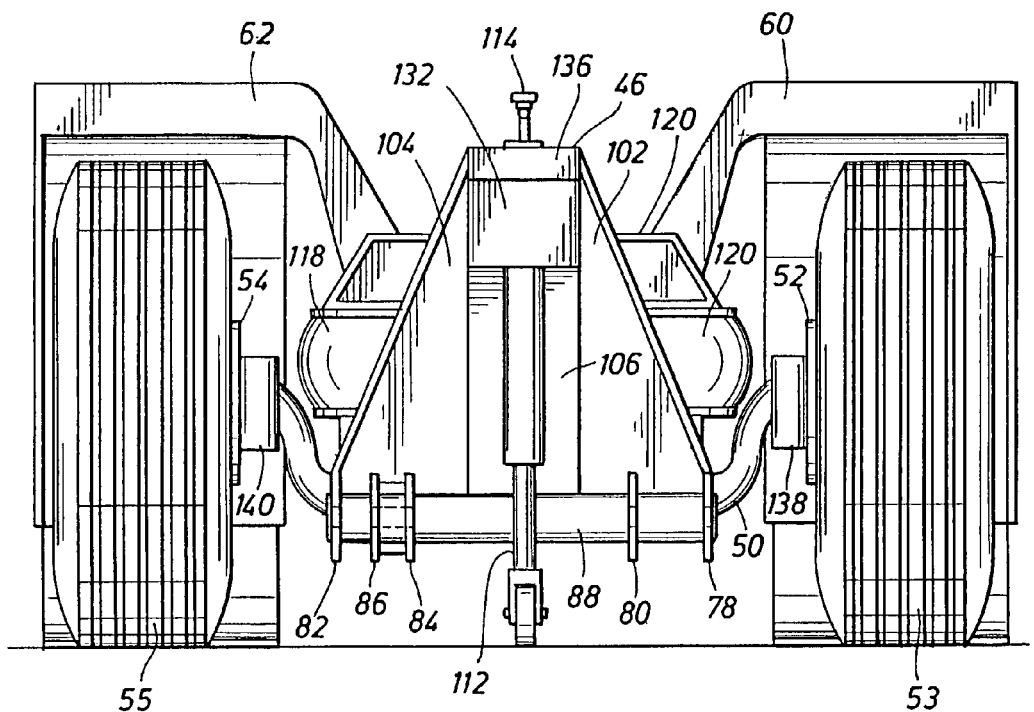
FIG. 4 is a front view of the load-transferring assembly of FIG. 1.
Figure 5:
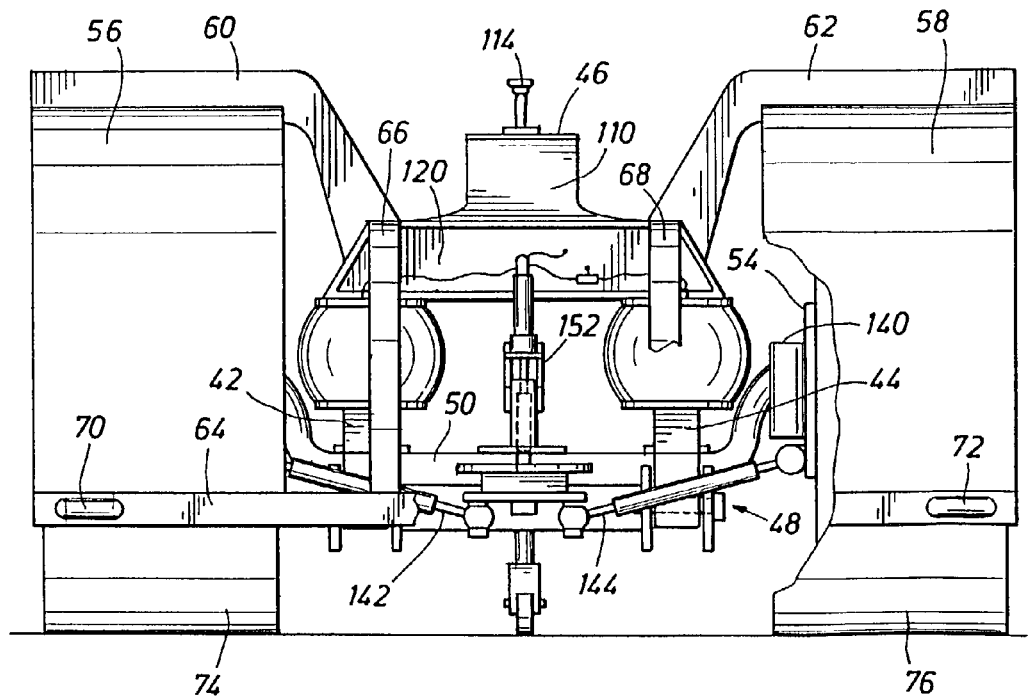
FIG. 5 is a rear view of the load-transferring assembly of FIG. 1.

Turning now to FIGS. 3, 4, and 5, a plan view, a front view, and a rear view, respectively, of the load-transferring assembly 10 are illustrated. The load-transferring assembly 10 includes a frame assembly 40 having a pair of generally parallel side arms 42 and 44, an elongate abutment member 46, a pivot connection assembly 48, and an auxiliary axle 50 extending between a pair of wheels 52 and 54 carrying tires 53 and 55, respectively. The frame assembly 40 is connected to a pair of wheel fenders 56 and 58 via support struts 60 and 62 and to a rear fender 64 via support struts 66 and 68. In the exemplary embodiment illustrated in the Figures, the rear fender 64 is configured to support various light fixtures (e.g., lights 70 and 72 in FIG. 5), such as brake lights, running lights, turn signal indicators, etc. A pair of mud flaps 74 and 76 (see FIG. 5) extend from the rear fender 64 proximate the region at which the rear fender 64 is connected to the wheel fenders 56 and 58.

The pivot connection assembly 48 is configured to pivotally connect to the pair of side arms 42 and 44 and to pivotally engage with the engagement members 34 and 36 to secure the assembly 10 to the vehicle 12. In the exemplary embodiment illustrated in FIGS. 3-5, the pivot connection assembly 48 includes a plurality of flanges 78, 80, 82, 84, and 86 connected to a transverse bar 88. The flanges 78 and 80 are generally parallel and spaced apart such that one end of the flanges 78 and 80 form a first cavity 90 for receiving the side arm 42 and the other end of the flanges 78 and 80 form a second cavity 92 for receiving the vehicle engagement member 34. Similarly, one end of the flanges 82 and 84 form a cavity 94 for receiving the side arm 44, while the other end of the flanges 82 and 84 cooperate with the flange 86 to form a second cavity 96 for receiving the vehicle engagement member 36. The ends of the side arms 42 and 44 are respectively secured within the cavities 90 and 94 by pins 98 and 100, which provide an axis about which the arms 42 and 44 may vertically pivot. With reference to FIG. 5, it can be seen that the other ends of the side arms 42 and 44 are attached to the axle 50, such as by bolts, rivets, welded joints, etc.

Figure 6:
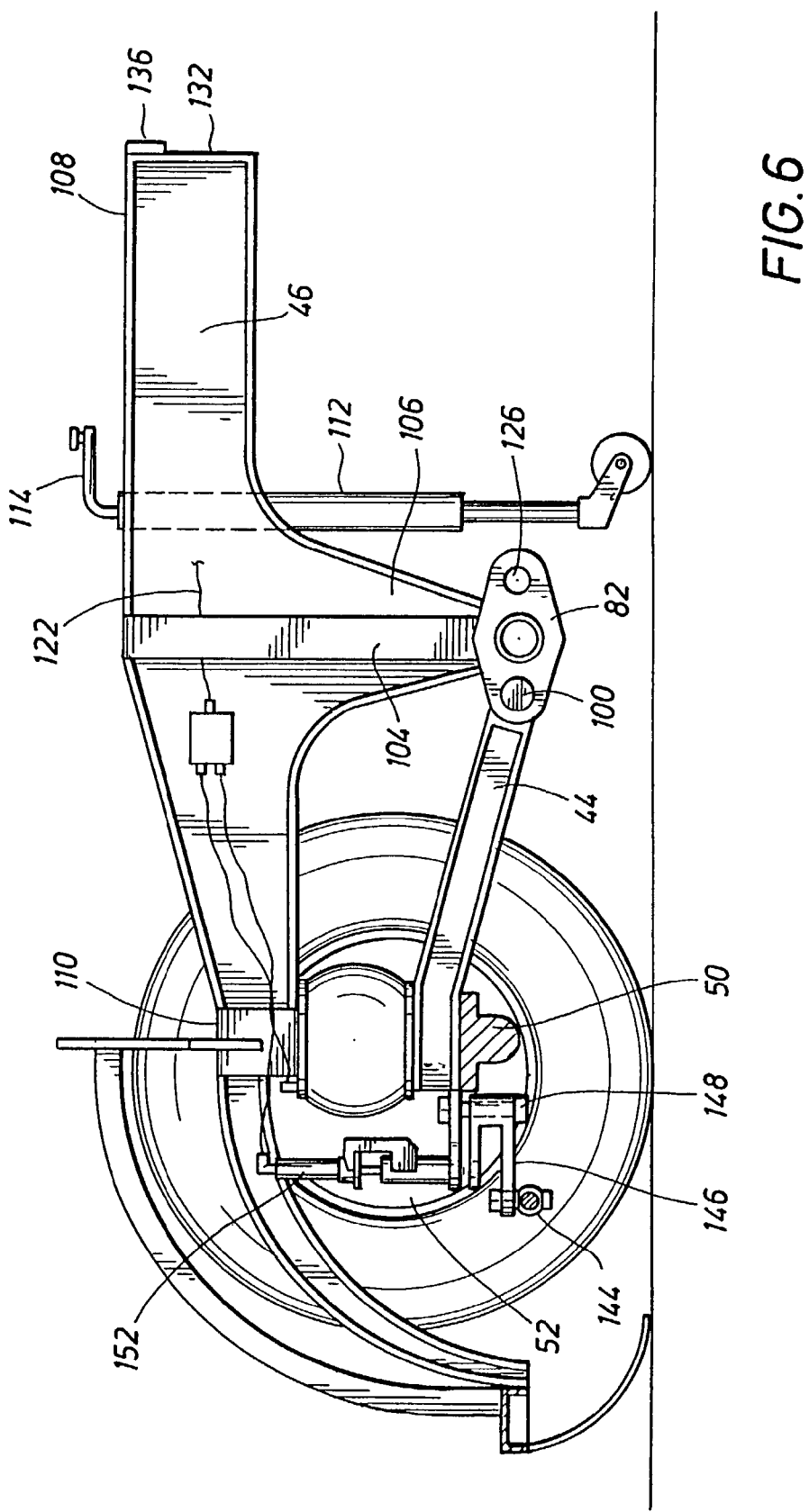
FIG. 6 is a cross-sectional view of the load-transferring assembly of FIG. 1, taken generally along the line 6-6 of FIG. 3.

Turning now to FIG. 4 and FIG. 6 (which includes a cross-sectional view of the assembly 10 taken generally along the line 6-6 of FIG. 3), it can be seen that the transverse bar 88 also supports the elongate abutment member 46 via support members 102, 104, and 106. In the exemplary embodiment illustrated in the Figures, the support members 102, 104, and 106 are disposed approximately midway between an abutment end 108 and a free end 110 of the abutment member 46 and fixedly attach the abutment member 46 to the transverse bar 88. Although the Figures show the support members 102, 104, and 106 as generally triangular, web-shaped structures, it should be understood that any of a variety of configurations and structures are possible which can provide adequate support and attachment of the abutment member 46.

An adjustable support leg 112 is disposed toward the abutment end 108 of the member 46 to stabilize the assembly 10 when not connected to the vehicle 12. A rotatable handle 114 allows for extension and retraction of the support leg 112, as desired.

The free end 110 of the abutment member 46 is positioned generally above the auxiliary axle 50. An actuator assembly is disposed between the free end 110 and the axle 50 and is operable to engage the abutment member 46 with the vehicle 12 in a manner that results in redistribution of a portion of the load on tandem axles 20 and 22 to the auxiliary axle 50 and the front axle 18, as will be described in detail below. In the exemplary embodiment illustrated in the Figures, the actuator assembly includes a pair of pneumatically activated air bags or bellows 116 and 118, such as air springs commercially available from Goodyear or Firestone. The free end 110 of the abutment member 46 terminates at a transverse portion 120 which connects the free end 110 to the top side of the bellows 116 and 118. The bottom side of the bellows 116 and 118 are attached to the ends of the side arms 42 and 44, which, in turn, are attached to the axle 50. The bellows 116 and 118 are pneumatically actuated via an air hose 122 which is detachably connectable to an air supply in the vehicle 12.

The amount of air pressure provided to the bellows 116 and 118 through the air hose 122 is based on the desired amount of load redistribution. In one embodiment, the amount of air pressure to actuate the bellows 116 and 118 is fixed in accordance with a setpoint established by control and regulator circuitry associated with the vehicle 12. In other embodiments, the control and regulator circuitry can be configured to have multiple setpoints that may be selected by an operator based on the gross vehicle weight. Alternatively, the control and regulator circuitry may be configured to determine a fixed setpoint based on monitored parameters, such as gross vehicle weight, tire pressure, etc. Or, the control and regulator circuitry may be configured to dynamically vary the amount of air pressure based on monitored parameters, such as terrain variations, load changes, direction of travel, etc.

Although the actuator assembly in the illustrated embodiment includes pneumatically actuated bellows to lift the abutment member 46, it should be understood that other types of actuator assemblies also are contemplated. Such assemblies may include hydraulically activated components, such as hydraulic pistons and cylinders, or any other type of structure that can lift the free end 110 of the abutment member 46 relative to the auxiliary axle 50.

Figure 7:
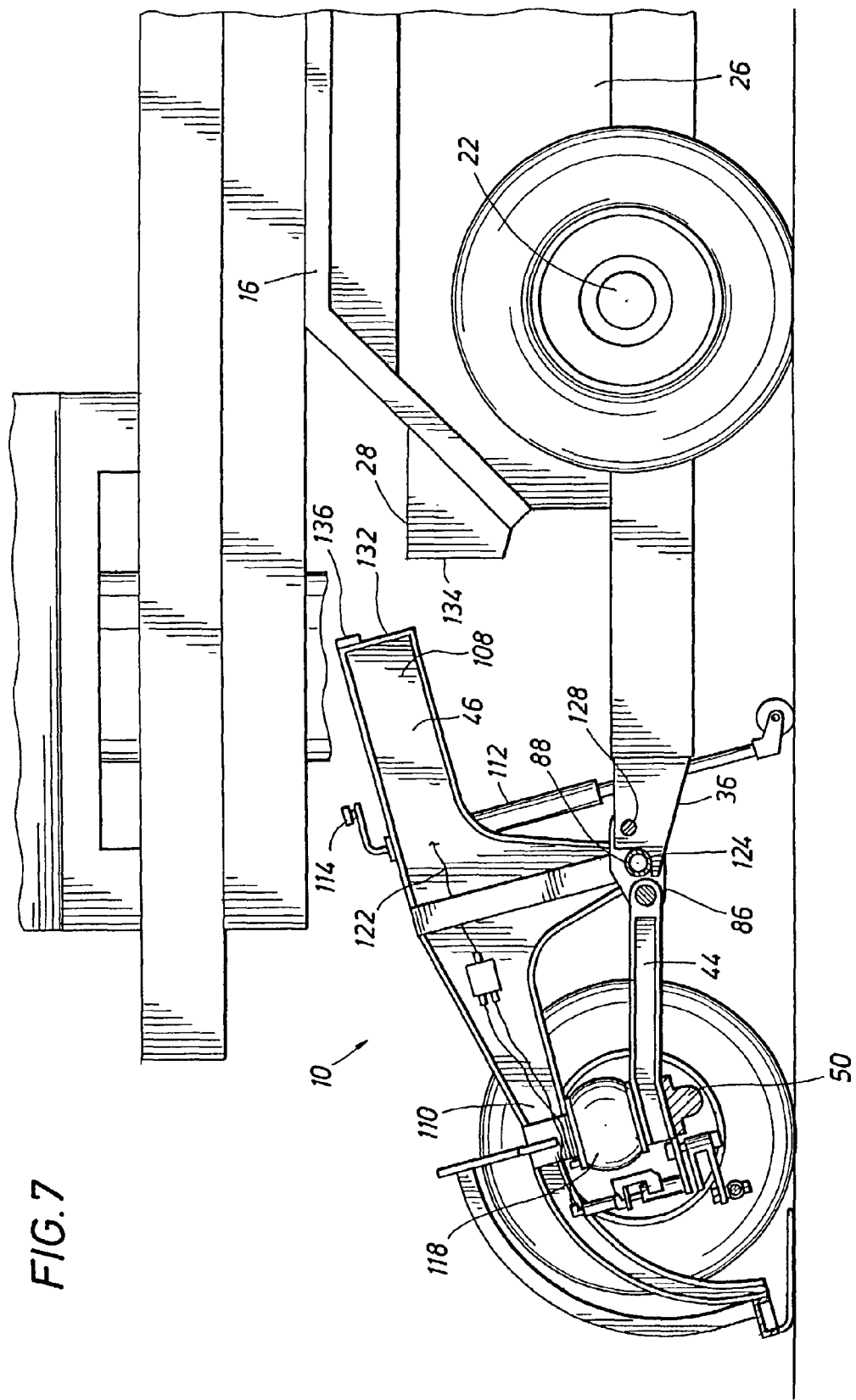
FIG. 7 is a side view of the load-transferring assembly of FIG. 6 attached to the load-bearing vehicle before the load has been transferred.
Figure 8:
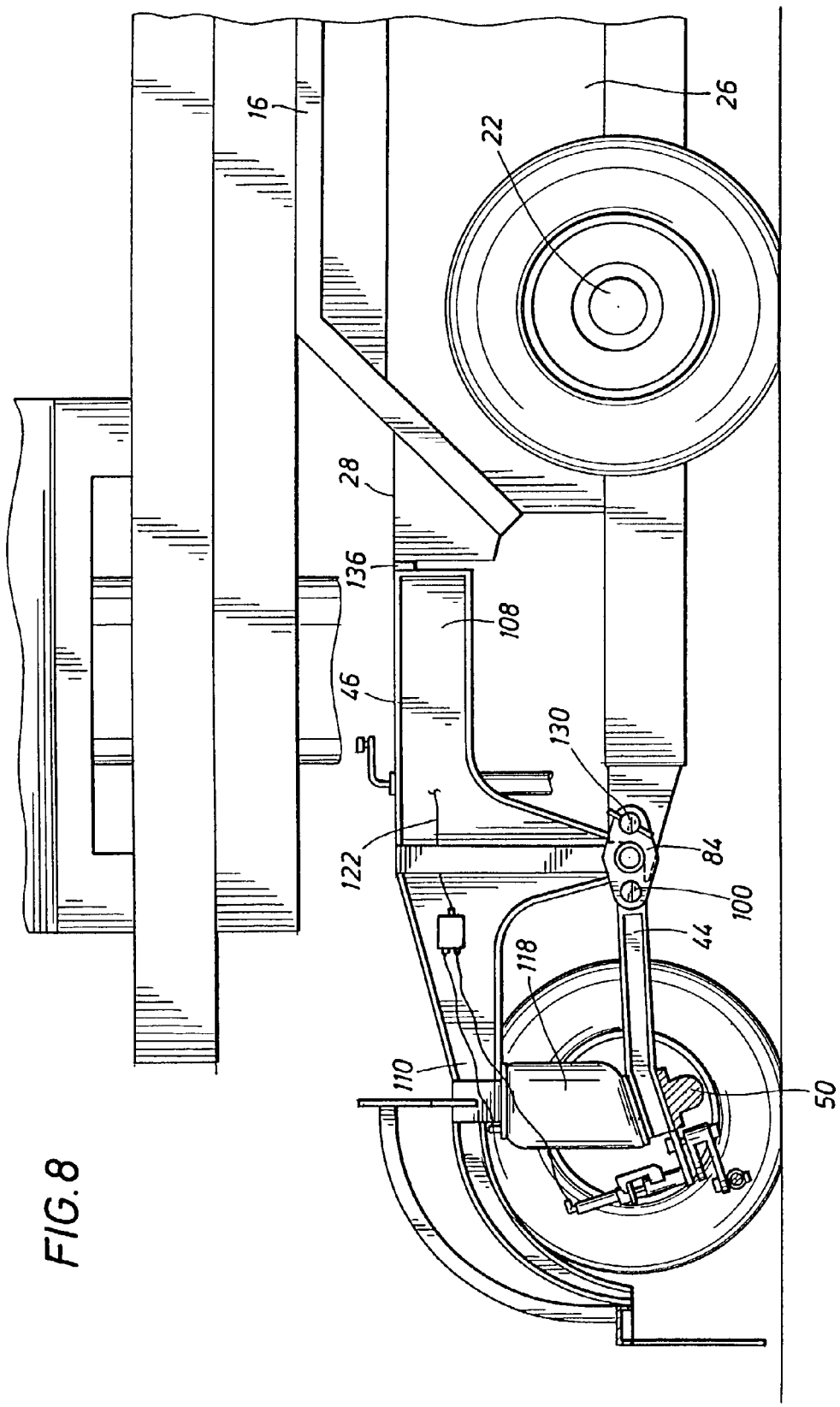
FIG. 8 is a side view of the load-transferring assembly of FIG. 6 attached to the load-bearing vehicle after the load has been transferred.

Referring now to FIGS. 7 and 8, attachment of the load-transferring assembly 10 to the vehicle 12 is shown. In FIG. 7, the assembly 10 is attached, but not actuated such that the axle load can be redistributed. In FIG. 8, the assembly 10 is attached and actuated and the load is redistributed. Both FIGS. 7 and 8 present a side cross-sectional view of the assembly 10 taken generally along the line 6-6 of FIG. 3.

Turning first to FIG. 7, the assembly 10 is positioned at the rear of the vehicle 10 such that the vehicle engagement members 34 and 36 are received within the cavities 92 and 96, respectively, of the pivot connection assembly 48. In FIG. 7, the flange 82 has been omitted to provide a better view of the pivot connection arrangement. When the members 34 and 36 are received within the cavities 92 and 96, the transverse bar 88 rests within a concave portion 124 of the members 34 and 36, and an aperture 126 through each of flanges 78, 80, 82, 84, and 86 aligns with an aperture 128 in each of engagement members 34 and 36. To securely attach the assembly 10 to the vehicle 12, lock pins 130 are inserted through the apertures 128 and 126. The lock pins 130 thus provide a pivot point about which the assembly 10 may vertically pivot relative to the vehicle 12.

To complete the engagement of the assembly 10 with the vehicle 12, the support leg is retracted via the handle 114 and the bellows 116 and 118 are pneumatically actuated through air hose 122 as shown in FIG. 8. Upon actuation, the free end 110 of the abutment member 46 is lifted relative to the auxiliary axle 50. As the lifting continues, the abutment member 46 pivots about transverse bar 88, lowering the abutment end 108 such that an abutment surface 132 at the end 108 of the member 46 engages (i.e., abuts) an vehicle abutment surface 134 of the vehicle abutment member 28. As long as the lifting force on the free end 110 is maintained, the abutment surfaces 132 and 134 remain statically engaged, effectively integrating the frame 40 of the assembly 10 with the frame 26 of the vehicle 12 and prohibiting any transverse movement of the assembly 10 relative to the vehicle 12. As a result, a portion of the load on the tandem axles 20 and 22 is transferred to both the auxiliary axle 50 and the single front axle 18.

The following example illustrates the resultant redistribution of the load. Given the interaxle spacings discussed with respect to FIG. 1 above, and assuming the distance between the tandem axle 22 and the auxiliary axle 50 is eight feet, the gross vehicle weight is 57,000 lbs. and the air pressure provided to the airbags 116 and 118 is approximately 55 psi, then the load on auxiliary axle is approximately 8700 lbs., the combined load on axles 20 and 22 is approximately 33,500 lbs., and the load on the front axle 18 is approximately 14,800 lbs.

In the exemplary embodiment illustrated in the Figures, a shim 136 is attached to the surface 132 of the abutment end 108. Use of the shim 136 may be desirable to account for irregularities and mismatches between the abutment surfaces 132 and 134. Thus, the shim 136 may be positioned as needed to optimize the engagement between the surfaces 132 and 134.

Also in the exemplary embodiment illustrated in the Figures, the static engagement between the vehicle 12 and the load-transferring assembly 10 is an abutment. In alternative embodiments, the static engagement may be accomplished by other configurations. For example, the vehicle 12 may include a receiving cavity for receiving the abutment end 108 of the assembly 10. Such a cavity may be configured to lock the abutment end 108 into position while allowing the load-redistribution forces imparted from the lifting action to be transferred through the abutment member to the frame 26 of the vehicle 12.

As discussed, the engagement of the assembly 10 with the vehicle 12 prohibits transverse movement of the assembly 10 relative to the vehicle 12. Thus, to facilitate tracking of the assembly 10 with respect to the vehicle 12, which enables turning maneuvers and prevents scuffing and damage to the tires, the auxiliary axle 50 is configured as a self-steering axle.

Referring back to FIGS. 3 and 5, the ends of auxiliary axle 50 are connected to the wheels 52 and 54 via pins 138 and 140, respectively, such that the wheels 52 and 54 are positively castered. In addition, the wheels 52 and 54 may be toed in (not shown) to provide additional directional stability. Turning of the wheels 52 and 54 is synchronized by interconnecting the wheels 52 and 54 via tie rods 142 and 144. The tie rods 142 and 144 are interconnected by attachment to a plate 146. The plate 146 couples the tie rods 142 and 144 to the axle 50 through a pivot pin 148 which passes through apertures in a tongue 150, which is fixedly attached to the axle 50, and in the tie rod plate 146. The pivot pin 148 provides a vertical pivot axis about which the tie rods 142 and 144, and thus the wheels 52 and 54, can pivot transversely relative to the axle 50.

The self-steering capability of the auxiliary axle 50, however, may hinder reverse maneuvers of the vehicle 12 when the assembly 10 is attached. For example, when attempting to back the vehicle 12 along a straight line, irregularities in the roadway surface may cause the wheels 52 and 54 to pivot. Thus, as the vehicle 12 continues to move in reverse, the tires on the wheels 52 and 54 may drag and scuff, potentially damaging the tires and/or the axle 50. Thus, in some embodiments, it may be desirable to lock the wheels 52 and 54 in a position suitable for straight movement in reverse.

Referring to FIGS. 5 and 6, a lock pin assembly 152 is provided, which, when actuated, drops a pin which locks the tie rod plate 146 to the tongue 150, thus preventing pivotal motion about the pivot pin 148. In the exemplary embodiment, the lock pin assembly 152 is pneumatically actuated via the air hose 122. Actuation may be performed manually by the operator of the vehicle 12 or may be performed automatically when the vehicle gears are placed in reverse. Alignment of the wheels 52 and 54 for reversing along a straight line may be performed manually simply by positioning of the vehicle 12. Alternatively, actuation of the lock pin assembly 152 may be prohibited until control electronics sense that wheels 52 and 54 are properly aligned.

It also may be desirable to further facilitate reverse maneuverability by removing at least a portion of the load on the auxiliary axle 50. Removal of the load may be accomplished by relieving a portion of the lifting force on the free end 110 of the abutment member 46. In the exemplary embodiment, the lifting force is removed by partially bleeding the air from the bellows 116 and 118 whenever the lock pin assembly 152 is actuated. Bleeding the air may be triggered manually by the vehicle operation or may be synchronized with actuation of the lock pin assembly 152 by control electronics in the vehicle 12.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A load-transferring assembly connectable to a vehicle having a front vehicle axle, a rear vehicle axle, a vehicle abutment member and an engagement member, said engagement member disposed proximate a rear portion of the vehicle, the load-transferring assembly comprising:
    an elongate abutment member comprising an abutment end and a free end, the abutment end configured to contact the vehicle abutment member;
    an auxiliary wheel axle;
    an actuator assembly disposed between the free end of the elongate abutment member and the auxiliary wheel axle;
    at least one arm having first and second ends, said at least one arm being attached to the auxiliary wheel axle at said first end; and
    a pivot connection assembly connected to the elongate abutment member, and pivotally connected to said at least one arm proximate said second end, and detachably engageable to the engagement member of the vehicle;
    wherein when the pivot connection assembly is connected to the engagement member of the vehicle, the elongate member is pivotally moveable such that the abutment end is moveable from a non-abutting relation to an abutting relation with the vehicle abutment member, and when the abutment end is in said abutting relation with the vehicle abutment member, transverse movement of the load-transferring assembly relative to the vehicle is substantially restricted, and
    when the actuator assembly is actuated such that a lifting force is applied to the free end of the elongate abutment member, a portion of a load on the rear vehicle axle is transferred to the auxiliary wheel axle.

2. The load-transferring assembly as recited in claim 1, wherein the actuator assembly comprises a pneumatic device.

3. The load-transferring assembly as recited in claim 2, wherein the pneumatic device is an air spring.

4. The load-transferring assembly as recited in claim 1, wherein the pivot connection assembly comprises a pivot connection configured to pivotally attach the load-transferring assembly to the engagement member.

5. The load-transferring assembly as recited in claim 1, wherein the auxiliary wheel axle is configured as a self-steering axle.

6. The load-transferring assembly as recited in claim 5, comprising a locking member configured to lock the self-steering axle in a fixed steering position.

7. The load-transferring assembly as recited in claim 6, wherein the locking member is in communication with the actuator assembly, such that when the locking member locks the self-steering axle at least a portion of the load transferred to the auxiliary wheel axle is removed.

8. The load-transferring assembly as recited in claim 1, wherein the pivot connection assembly comprises a transverse bar, and a plurality of flanges connected to said transverse bar, the flanges each having an aperture.

9. A load-transferring trailing assembly connectable to a load-bearing vehicle having a front vehicle wheel axle and a rear vehicle wheel axle, a vehicle abutment member and an engagement member, the assembly comprising:
    a pivotable elongate member extending between a static connection end and a free end, the static connection end configured to form a static connection with the vehicle abutment member such that transverse movement of the load-transferring trailing assembly relative to the vehicle is substantially inhibited, the elongate member having a support member;
    a wheel axle assembly;
    at least one arm having first and second ends, said at least one arm being attached to the wheel axle assembly at said first end;
    a pivot connection assembly connected to said support member, and pivotally connected to said at least one arm proximate to the second end, and detachably engageable to the engagement member; and
    a lifting member arranged between the free end of the elongate member and the wheel axle assembly, the lifting member configured to apply a lifting force to the free end of the elongate member such that a portion of a load on the rear vehicle axle is transferred to the wheel axle assembly, wherein when the pivot connection assembly is connected to the engagement member of the vehicle, the elongate member is pivotally moveable such that the static connection end is moveable from a non-static position to said static connection with the vehicle abutment member.

10. The load-transferring trailing assembly as recited in claim 9, wherein the pivot connection assembly is configured to pivotally engage with the engagement member.

11. The load-transferring trailing assembly as recited in claim 10, wherein actuation of the lifting member pivots the elongate member about a horizontal axis, thereby causing the elongate member to form the static connection with the vehicle.

12. The load-transferring trailing assembly as recited in claim 9, wherein the wheel axle assembly comprises a self-steering axle.

13. The load-transferring trailing assembly as recited in claim 12, wherein the wheel axle assembly comprises a locking member configured to lock the self-steering axle in a fixed steering position.

14. The load-transferring trailing assembly as recited in claim 13, wherein the locking member is in communication with the lifting member such that at least a portion of the load transferred to the wheel axle assembly is removed when the self-steering axle is locked in the fixed steering position.

15. The load-transferring trailing assembly as recited in claim 9, wherein the lifting member is pneumatically actuated.

16. The load-transferring trailing assembly as recited in claim 9, wherein the static connection is an abutment.

17. The load-transferring trailing assembly as recited in claim 9, wherein the pivot connection assembly comprises a transverse bar, and a plurality of flanges connected to said transverse bar, the flanges each having an aperture.

18. A combination, comprising:
a load-bearing vehicle having a front wheel axle, a rear wheel axle, a vehicle abutment member, and an engagement member; and
a load-transferring trailing assembly connected to the vehicle abutment member and the engagement member of the load-bearing vehicle, the load-transferring assembly comprising:
a pivotable elongate member extending between a static connection end and a free end, the static connection end configured to form a static connection with the load-bearing vehicle such that transverse movement of the load-transferring trailing assembly relative to the load-bearing vehicle is substantially inhibited, the elongate member having a support member;
a auxiliary wheel axle;
at least one arm having first and second ends, said at least one arm being attached to the auxiliary wheel axle at said first end;
a pivot connection assembly connected to the support member, and pivotally connected to said at least one arm proximate to the second end, and detachably engageable to the engagement member of said vehicle, the elongate member pivotally moveable such that the static connection end is moveable from a non-static position to said static connection; and
an actuator assembly disposed between the free end of the elongate member and the auxiliary wheel axle, the actuator assembly configured to apply a lifting force to the free end such that a portion of a load on the rear vehicle axle is transferred to the auxiliary wheel axle.

19. The combination as recited in claim 18, wherein the static connection is an abutment.

20. The combination as recited in claim 18, wherein the pivot connection assembly comprises a pivot member to pivotally engage the load-transferring trailing assembly with the engagement member of the load-bearing vehicle.

21. The combination as recited in claim 18, wherein the actuator assembly is pneumatically actuated.

22. The combination as recited in claim 18, wherein the auxiliary wheel axle is configured as a self-steering axle.

23. The combination as recited in claim 22, wherein the load-transferring trailing assembly comprises a locking device configured to lock the self-steering axle in a fixed steering position.

24. The combination as recited in claim 23, wherein the locking device is in communication with the actuator assembly, such that a portion of the load transferred to the auxiliary wheel axle is removed when the self-steering axle is locked.

25. The combination as recited in claim 18, wherein the pivot connection assembly comprises a transverse bar, and a plurality of flanges connected to said transverse bar, the flanges each having an aperture.

* * * * *